(12) United States Patent
Jorge

(10) Patent No.: US 9,526,363 B2
(45) Date of Patent: Dec. 27, 2016

(54) DRINKING APPARATUS

(71) Applicant: Alexander A Jorge, Bellevue, WA (US)

(72) Inventor: Alexander A Jorge, Bellevue, WA (US)

(*) Notice: Subject to any disclaimer, the term of this patent is extended or adjusted under 35 U.S.C. 154(b) by 0 days.

(21) Appl. No.: 14/710,575

(22) Filed: May 12, 2015

(65) Prior Publication Data
US 2015/0320246 A1 Nov. 12, 2015

Related U.S. Application Data

(60) Provisional application No. 61/992,151, filed on May 12, 2014.

(51) Int. Cl.
A47G 21/18 (2006.01)
A47G 19/22 (2006.01)
B65D 25/54 (2006.01)
B65D 53/02 (2006.01)
B65D 51/24 (2006.01)
B65D 47/06 (2006.01)
B65D 81/38 (2006.01)

(52) U.S. Cl.
CPC ............ A47G 21/18 (2013.01); A47G 19/2222 (2013.01); A47G 19/2266 (2013.01); A47G 19/2272 (2013.01); A47G 19/2288 (2013.01); B65D 25/54 (2013.01); B65D 47/06 (2013.01); B65D 51/24 (2013.01); B65D 53/02 (2013.01); B65D 81/3865 (2013.01); B65D 2231/022 (2013.01); Y02W 30/807 (2015.05)

(58) Field of Classification Search
CPC ............ A47G 19/2272; A47G 19/2266; A47G 19/2205; A47G 21/18; A47G 19/2222; B65D 25/54; B65D 51/24; B65D 53/02; B65D 53/00; B65D 41/0442; B65D 41/0435; B65D 41/04; B65D 65/18; B65D 47/06; B65D 47/061; B65D 47/063; B65D 77/28
USPC ....... 220/709, 706, 705, 304, 288, 377, 378, 220/662; 215/229
See application file for complete search history.

(56) References Cited

U.S. PATENT DOCUMENTS

| | | | | |
|---|---|---|---|---|
| 2,052,496 A | * | 8/1936 | Stassi | A47G 19/2266 215/229 |
| 2,231,418 A | * | 2/1941 | Trotter | A61J 1/1406 215/247 |
| 3,106,312 A | * | 10/1963 | Hitchcock | A47G 19/2266 215/229 |
| 4,244,477 A | * | 1/1981 | Seel | B65D 47/06 215/229 |
| 4,494,668 A | * | 1/1985 | Lottick | A47G 19/2266 215/229 |
| 5,029,719 A | * | 7/1991 | Solomon | B65D 47/243 215/229 |
| 5,339,982 A | * | 8/1994 | Tardie | A47G 19/2227 215/229 |

(Continued)

Primary Examiner — Robert J Hicks

(57) ABSTRACT

A reusable beverage container contains an insulated cup, a lid, and a straw. The beverage is stored in the insulated cup and an opening of the insulated cup is covered with the lid. The lid is removably attached to the insulated cup with an inner locking lip and an outer locking lip. A gasket can also be used to attach the lid to the insulated cup. The straw traverses into the insulated cup through a straw receiving hole. The straw is positioned in the straw receiving hole such that a bias-cut edge of the straw is positioned within the insulated cup and a straight-cut edge of the straw is positioned outside the lid. A stoppage band of the straw prevents the straw from coming out of the lid.

16 Claims, 9 Drawing Sheets

(56) References Cited

U.S. PATENT DOCUMENTS

| | | | | |
|---|---|---|---|---|
| 2002/0053574 A1* | 5/2002 | Thompson | A47G 19/2272 | 220/710 |
| 2009/0256000 A1* | 10/2009 | Wallace | A47G 21/18 | 239/33 |
| 2010/0294772 A1* | 11/2010 | Judge | A47G 19/2272 | 220/288 |
| 2013/0126527 A1* | 5/2013 | Chiu | A47G 19/2272 | 220/212 |
| 2014/0151319 A1* | 6/2014 | DeFelice | A61J 9/04 | 215/11.5 |

* cited by examiner

DRINKING APPARATUS

The current application claims a priority to the U.S. Provisional Patent application Ser. No. 61/992,151 filed on May 12, 2014.

FIELD OF THE INVENTION

The present invention relates generally to drinking containers. More specifically, the present invention is a drinking container for bubble tea or other similar beverages.

BACKGROUND OF THE INVENTION

Tumblers are widely used by individuals who prefer to carry a beverage while traveling from one place to another. Moreover, tumblers help minimize the use of plastic beverage containers which is beneficial to the environment. Tumblers are used with both hot beverages and cold beverages and can be made from a variety of materials. Stainless steel and plastic are among the most preferred materials for tumblers. In most instances, stainless steel tumblers are used to carry a hot beverage and plastic tumblers are used to carry a cold beverage. Even though the existing tumblers have a series of advantages in terms of convenience, they also have distinct disadvantages.

With the growing demand for bubble tea and increased awareness for environment preservation, the need for an environmentally friendly beverage container is clearly evident. In order to satisfy the demand for bubble tea, these containers need to have the ability to receive a straw with a larger diameter. The larger diameter is essential to draw out the tapioca pearls, commonly known as boba, from the bubble tea.

Tumblers are used to carry a variety of beverages that can be, but are not limited to, coffee, tea, and bubble tea. The drinking method for the tumblers varies according to the beverage that is stored within the tumbler. As an example, a straw is utilized when drinking most cold beverages. When drinking bubble tea, the straw is also used to draw out the tapioca pearls from the bubble tea. Therefore, a larger diameter straw needs to be utilized. However, most plastic tumblers do not have the ability to accommodate the larger diameter straw along with the lid. In other words, the diameter of the straw receiving hole of the lid is generally smaller than the diameter of the straw. Therefore, consumers currently do not have the ability to drink bubble tea with any of the existing tumblers.

The objective of the present invention is to address the aforementioned issues. In particular, the present invention introduces an insulated drinking container such that minimum heat transfer occurs between the beverage within the insulated drinking container and the atmosphere. Resultantly, the temperature properties of the beverage remain unchanged. A straw introduced in the present invention is sufficiently sized in order to maximize the delivery of the beverage and the tapioca pearls stored within the insulated drinking container. To receive a larger sized straw, the present invention contains a sufficiently sized straw receiving hole and an appropriately sized lid. In particular, the straw snugly fits within the straw receiving hole while the lid conceals the insulated drinking container.

DETAIL DESCRIPTIONS OF THE INVENTION

All illustrations of the drawings are for the purpose of describing selected versions of the present invention and are not intended to limit the scope of the present invention.

The present invention introduces a reusable beverage container. In particular, the present invention is intended to be used for bubble tea. However, the present invention can be used with other similar beverages such as iced coffee and ice tea.

Figure 1:
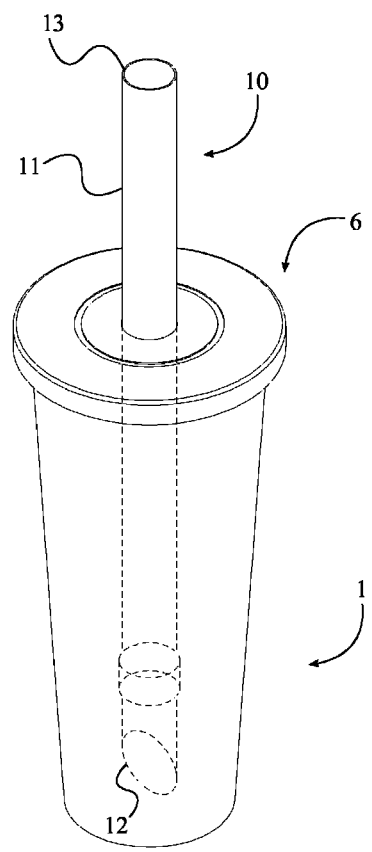
FIG. 1 is a perspective view of the present invention.
Figure 7:
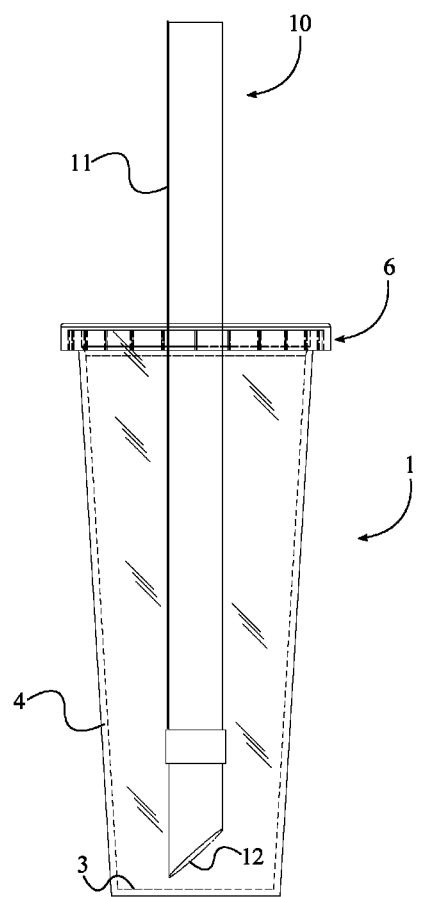
FIG. 7 is side view of the present invention, wherein the insulated cup and the lid are transparent.

As seen in FIG. 1, the present invention comprises an insulated cup 1, a lid 6, and a straw 10. The insulated cup 1 holds bubble tea in the preferred embodiment of the present invention. However, in another embodiment of the present invention, the insulated cup 1 can hold any other beverage. The insulation of the insulated cup 1 helps maintain the thermal properties of the beverage. For instance, when a cold beverage is stored within the insulated cup 1, the insulation helps maintain the temperature of the cold beverage. In particular, the insulation prevents the cold beverage from absorbing heat from the atmosphere. The lid 6 conceals the beverage stored in the insulated cup 1 and also receives the straw 10 which is used by the user to consume the beverage. In order to conceal the beverage, the lid 6 comprises an inner locking lip 8 and an outer locking lip 9. The inner locking lip 8 and the outer locking lip 9 are removably attached to an outer brim 5 of the insulated cup 1 such that the lid 6 is removably attached to the insulated cup 1. The lid 6 further comprises a straw receiving hole 7 which serves as an insertion point for the straw. Since the present invention is intended for bubble tea, the straw 10 is also utilized to draw out the tapioca pearls from within the insulated cup 1. However, if the present invention is utilized with a different beverage, the straw 10 is utilized solely for drawing out the beverage. In order to do so, the straw 10 traverses into the insulated cup 1 through the straw receiving hole 7. As illustrated in FIG. 7, both the lid 6 and the insulated cup 1 are transparent in one embodiment of the present invention. However, the material properties of the lid 6 and the insulated cup 1 can vary in different embodiments of the present invention.

Figure 5A:
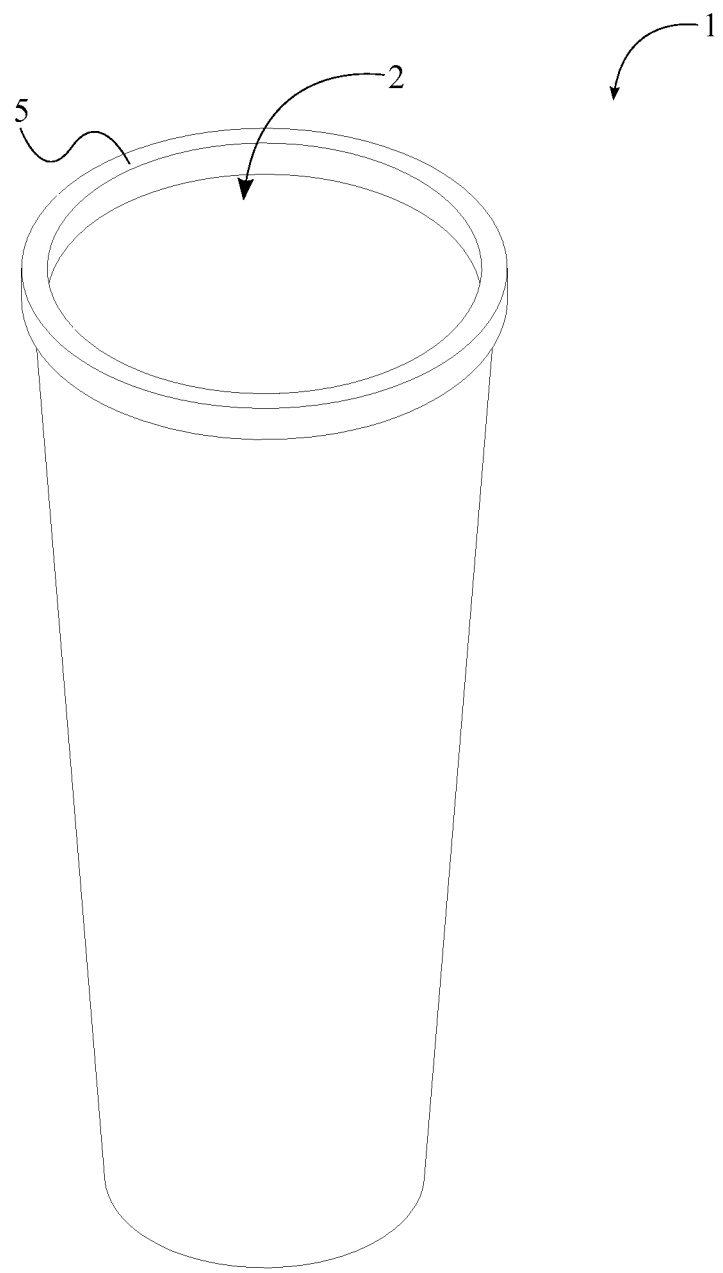
FIG. 5A is a perspective view of the insulated cup.
Figure 5B:
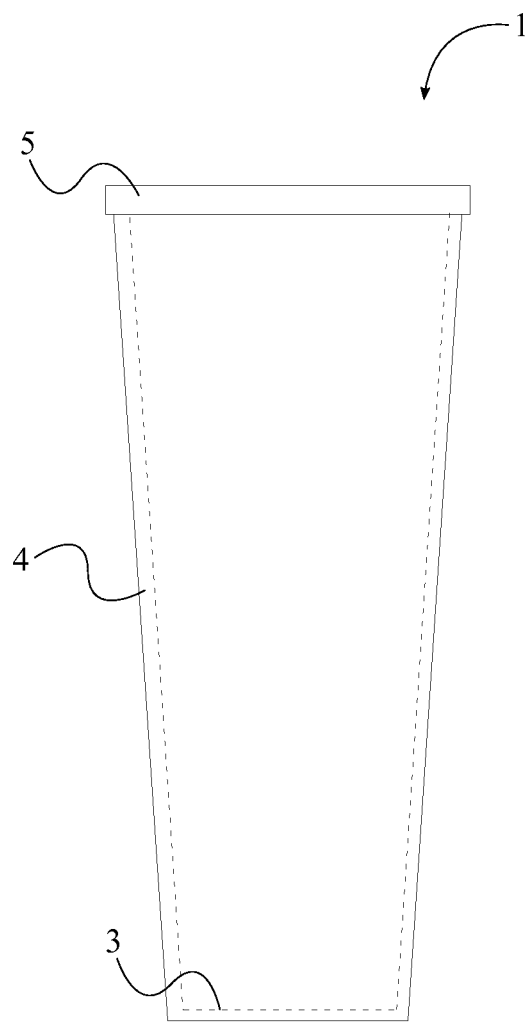
FIG. 5B is a side view of the insulated cup.
Figure 6:
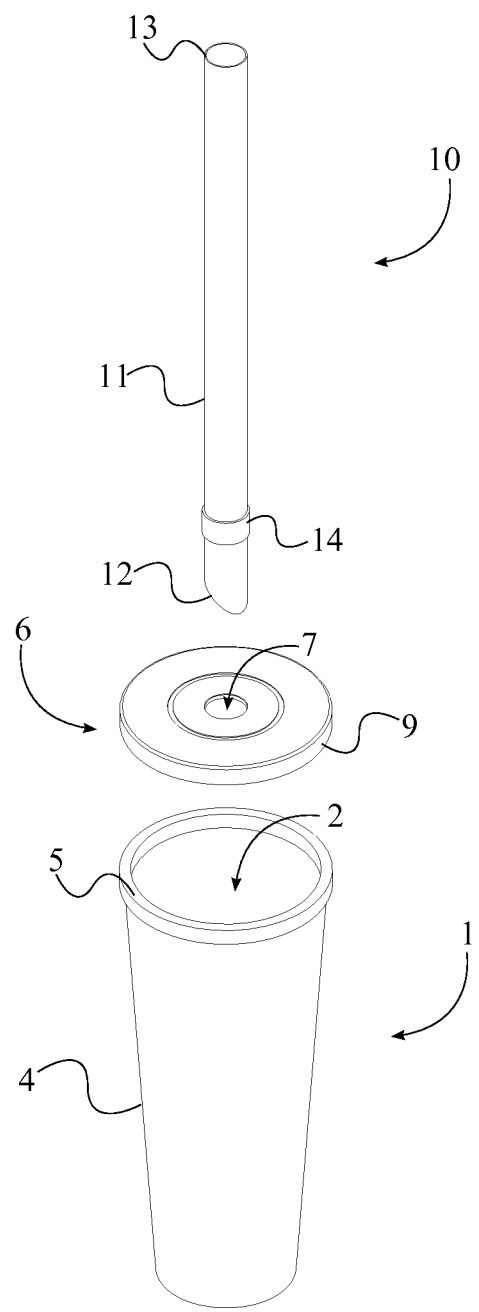
FIG. 6 is a perspective exploded view of the present invention.

FIG. 5A and FIG. 5B is are illustrations of the insulated cup 1 that stores the beverage. As illustrated, the insulated cup 1 further comprises an opening 2, a base section 3, and a lateral wall 4 in addition to the outer brim 5. The beverage is poured into the insulated cup 1 through the opening 2 as the opening 2 is internally delineated by the outer brim 5, the lateral wall 4, and the base section 3. The diameter of the opening 2 can differ in different embodiments of the present invention depending on the volume of the insulated cup 1. When the present invention is used for bubble tea, the tapioca pearls are placed in the base section 3 and the remainder of the beverage is filled to the height of the lateral wall 4. In order to do so, the lateral wall 4 is perimetrically positioned around the base section 3. The height of the lateral wall 4 can vary in different embodiments of the present invention, where the different heights determine different volumes for the insulated cup 1. The outer brim 5 is delineated by the lateral wall 4 and oppositely positioned from the base section 3 across the lateral wall 4. Therefore, when the lid 6 is attached, the lid 6 is also positioned opposite of the base section 3 and along the lateral wall 4.

Figure 3:
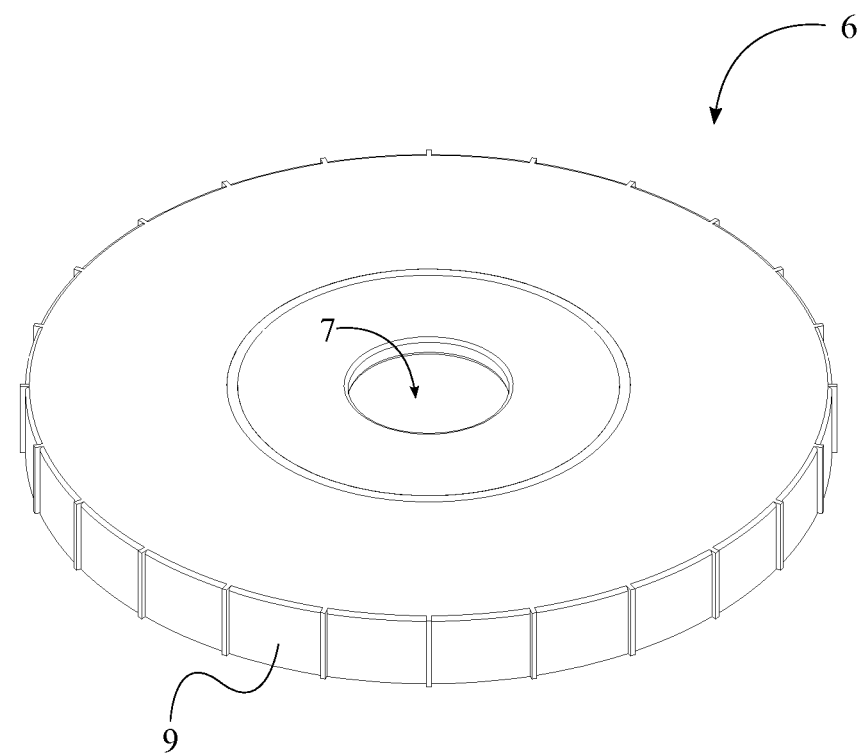
FIG. 3 is a perspective view of the lid.
Figure 4A:
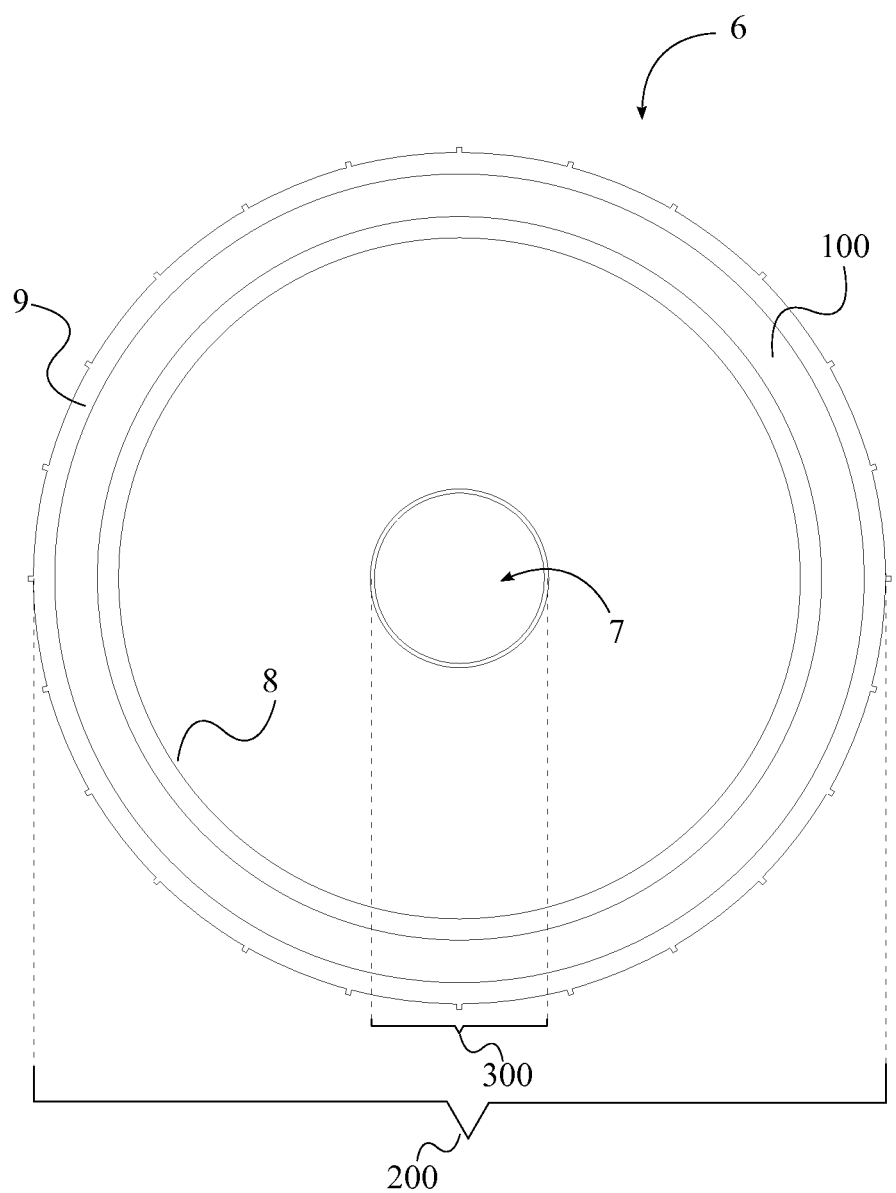
FIG. 4A is a bottom view of the lid, wherein the gasket is positioned in between the outer locking lip and the inner locking lip.

As seen in FIG. 3 and FIG. 4A, the outer locking lip 9 is perimetrically positioned around the lid 6. Therefore, when the lid 6 is attached to the insulated cup 1 the outer brim 5 is in between the outer locking lip 9 and the inner locking lip 8. The outer locking lip 9 and the inner locking lip 8 are sufficiently sized such that the outer brim 5 snugly fits in between the outer locking lip 9 and the inner locking lip 8. In order to secure the outer brim 5, the inner locking lip 8 is positioned concentric with the outer locking lip 9 as the inner locking lip 8 is positioned within the outer locking lip 9. As shown in FIG. 4A, the straw receiving hole 7 is positioned within the inner locking lip 8 and the outer locking lip 9. In the preferred embodiment of the present invention, the straw receiving hole 7 is concentrically positioned with the outer locking lip 9 and the inner locking lip 8 so that the straw 10 can be centrally inserted into the insulated cup 1. However, in another embodiment of the present invention, the straw receiving hole 7 can be positioned elsewhere on the lid 6 as along as the straw receiving hole 7 is positioned within the inner locking lip 8.

Figure 4B:
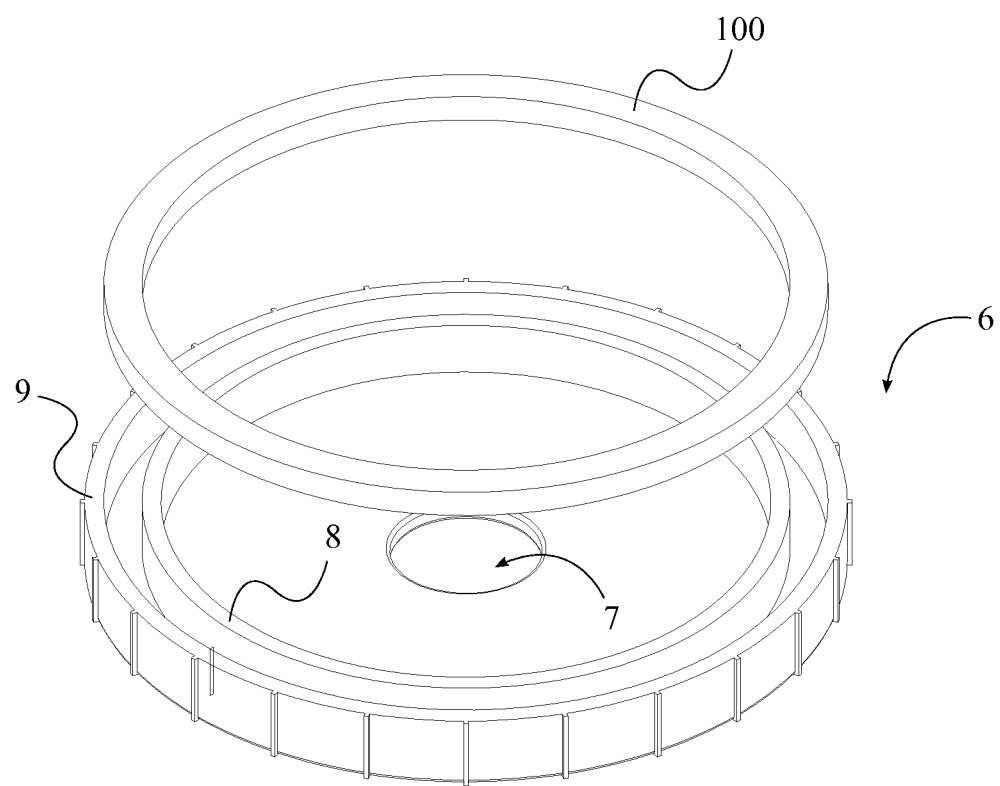
FIG. 4B is a perspective exploded view of the lid and the gasket.

As seen in FIG. 4A and FIG. 4B, the lid 6 further comprises a gasket 100. The gasket 100 is integrated into the lid 6 in between the inner locking lip 8 and the outer locking lip 9. As a result, when the lid 6 is removably attached to the insulated cup 1, the gasket 100 is pressed against the outer brim 5. The secure seal between the lid 6 and the insulated cup 1 ensures that the thermal properties of the beverage remain unchanged over a lengthy time period. The gasket 100 is preferably a rubber gasket. When attaching the lid 6 to the insulated cup 1, the lid 6 is pushed against the outer brim 5. As a result, the gasket 100 is compressed such that the beverage within the insulated cup 1 is secured.

In order to allow the user to establish a secure connection with the lid 6, the outer locking lip 9 can comprise a plurality of protrusions that is extended along an outer lateral surface of the outer locking lip 9. In such instances, the plurality of protrusions is vertically extended along the outer lateral surface and radially positioned around the outer brim 5. The plurality of protrusions is beneficial to provide a gripping surface to the user when handling the lid 6.

The lid 6 can also be attached to the insulated cup 1 through a screw mechanism. In order to do so, the outer locking lip 9 can comprise a first plurality of threads. To engage with the first plurality of threads, an outer surface of the outer brim 5 can comprise a second plurality of threads. Therefore, the user can engage the first plurality of threads with the second plurality of threads in order to attach the lid 6 to the insulated cup 1.

In a preferred embodiment of the present invention, the lid 6 diameter can be 100 millimeters (mm). Even though the lid 6 utilized in the preferred embodiment of the present invention is flat in shape, the lid 6 can be a different shape in other embodiments of the present invention. As an example, the lid 6 can have a dome-shape. The dome-shape provides extra space in addition to the space provided by the insulated cup 1. The outer locking lip 9 constructs the outermost edge of the lid 6. Therefore, the diameter 200 of the outer locking lip 9 is also about 100 mm. Since a larger diameter straw 10 is utilized within the present invention, the diameter 300 of the straw receiving hole 7 is about 15 mm. As a result, the straw receiving hole 7 diameter 300 and the outer locking lip 9 diameter 200 has a ratio of about 1.5:10. Since the straw 10 snugly fits within the straw receiving hole 7, the straw 10 has an outer diameter of about 13 mm and an inner diameter of about 11 mm. The large diameter of the straw 10 is beneficial when drawing out tapioca pearls from the insulated cup 1. However, in another embodiment of the present invention, the lid 6, the straw receiving hole 7, and the straw 10 can have different dimensions.

Figure 2:
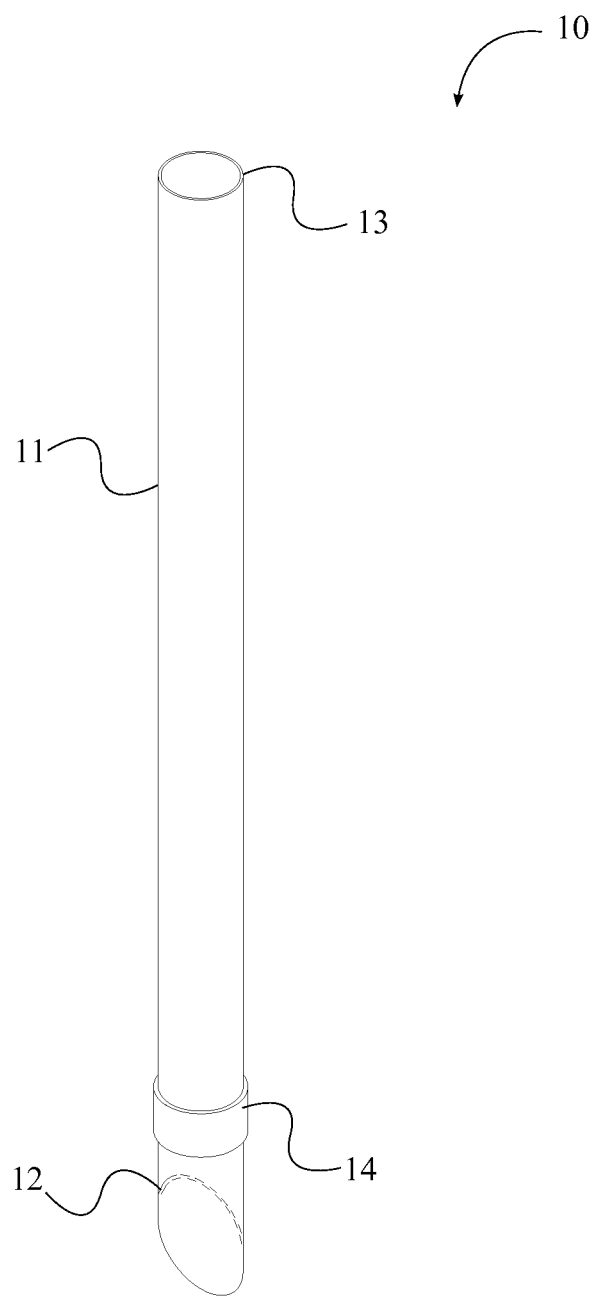
FIG. 2 is a perspective view of the straw.

As seen in FIG. 2, the straw 10 comprises an annular body 11, a bias-cut edge 12, and a straight-cut edge 13. The height of the straw 10 is determined by the height of the annular body 11. The user draws out the beverage at the straight-cut edge 13. In the preferred embodiment of the present invention, the bias-cut edge 12 is beneficial to draw in tapioca pearls into the straw 10 from the beverage. The bias-cut edge 12 eliminates the need to lift up the straw 10 from the beverage to draw out the tapioca pearls. In order to effectively transfer the beverage from within the insulated cup 1 to the mouth of the user, the bias-cut edge 12 and the straight-cut edge 13 are oppositely positioned from each other across the annular body 11. When the straight-cut edge 13 and the bias-cut edge 12 are extended along a cross-sectional plane of the straw 10, an acute angle is created between the straight-cut edge 13 and the bias-cut edge 12. When the straw 10 is positioned within the straw receiving hole 7, the annular body 11 is concentrically positioned with the straw receiving hole 7 initially. However, since the straw receiving hole 7 has a larger diameter 300 than the straw 10, the user can conveniently move the straw 10 within the straw receiving hole 7. When the straw 10 is appropriately placed, the straight-cute edge 13 is externally positioned from the lid 6 and the insulated cup 1. Moreover, the bias-cut edge 12 is positioned within the lid 6 and the insulated cup 1, adjacent to the base section 3 as seen in FIG. 1.

The straw 10 further comprises a stoppage band 14 which is also illustrated in FIG. 2. The stoppage band 14 stops the straw 10 from completely coming out of the insulated cup 1. In order to do so, the stoppage band 14 is perimetrically and externally attached around the annular body 11 and positioned between the bias-cut edge 12 and the lid 6. Preferably, the stoppage band 14 is positioned adjacent the bias-cut edge 12 such that the straw 10 can be moved in a wider range.

Preferably, the present invention is intended to be used with bubble tea, milk tea, and boba tea. These beverages can include, but is not limited to, tea, coffee, or a fruit base. The straw 10 which has a larger diameter allows the user to draw out either the tapioca pearls, flavored jellies, pudding/custards, or cut fruit pieces from within the insulated cup 1. The present invention can be similarly used with a beverage with caffeine or a beverage with no caffeine.

When utilizing the present invention, the following steps are preferably followed. Initially, the beverage is poured into the insulated cup 1 through the opening 2. Next, the opening 2 is covered with the lid 6 such that the outer brim 5 of the insulated cup 1 is positioned in between the outer locking lip 9 and the inner locking lip 8. To consume the beverage, the straw 10 is positioned in the straw receiving hole 7. In doing so, the bias-cut edge 12 is positioned within the insulated cup 1 such that the straight-cut edge 13 is positioned outside the lid 6. When consuming the beverage within the insulated cup 1, the user draws the beverage at the straight-cut edge 13. Consequently, the beverage enters the straw 10 at the bias-cut edge 12 and travels along the annular body 11 towards the straight-cut edge 13. The larger diameter of the straw 10 allows the user to easily draw the tapioca pearls in bubble tea.

Although the invention has been explained in relation to its preferred embodiment, it is to be understood that many other possible modifications and variations can be made without departing from the spirit and scope of the invention as hereinafter claimed.

What is claimed is:

1. A reusable beverage container comprises:
   an insulated cup, wherein the insulated cup comprises an opening, a base section, and a lateral wall, wherein the lateral wall is perimetrically positioned around the base section, wherein an outer brim of the insulated cup is delineated by the lateral wall and oppositely positioned from the base section across the lateral wall, wherein the opening is internally delineated by the outer brim, the lateral wall, and the base section;
   a lid;
   a straw;
   the lid comprises a straw receiving hole, an inner locking lip, and an outer locking lip;
   the straw comprises an annular body, a bias-cut edge, and a straight-cut edge, wherein the straw further comprises a stoppage band positioned adjacent the bias-cut edge of the straw, wherein the straw is characterized by an outer diameter of about 13 mm and an inner diameter of about 11 mm;
   the inner locking lip and the outer locking lip being removably attached to the outer brim of the insulated cup; and
   the straw traversing into the insulated cup through the straw receiving hole.

2. The reusable beverage container as claimed in claim 1, wherein:
   the lid further comprises a gasket;
   the outer locking lip being perimetrically positioned around the lid;
   the straw receiving hole being positioned within the outer locking lip;
   the inner locking lip being positioned in between the outer locking lip and the straw receiving hole;
   the inner locking lip being concentric to the outer locking lip;
   the gasket being concentrically positioned with the inner locking lip and the outer locking lip; and
   the gasket being positioned in between the inner locking lip and the outer locking lip.

3. The reusable beverage container as claimed in claim 2, wherein the straw receiving hole being concentrically positioned with the outer locking lip and the inner locking lip.

4. The reusable beverage container as claimed in claim 1, wherein a diameter ratio between the straw receiving hole and the outer locking lip is about 1.5:10.

5. The reusable beverage container as claimed in claim 1, wherein:
   the bias-cut edge and the straight-cut edge are oppositely positioned from each other across the annular body;
   the annular body being concentrically positioned with the straw receiving hole;
   the straight-cut edge being externally positioned from the lid and the insulated cup; and
   the bias-cut edge being positioned within the lid and insulated cup, adjacent to the base section.

6. The reusable beverage container as claimed in claim 1, wherein, the stoppage band is perimetrically attached around the annular body, wherein the stoppage band is positioned between the bias-cut edge and the lid.

7. The reusable beverage container as claimed in claim 1, wherein the insulated cup is transparent.

8. The reusable beverage container as claimed in claim 1, wherein the lid is transparent.

9. A reusable beverage container comprises:
   an insulated cup;
   a lid;
   a straw;
   the lid comprises a straw receiving hole, an inner locking lip, and an outer locking lip;
   the insulated cup comprises an outer brim, an opening, a base section, and a lateral wall;
   the straw comprises an annular body, a bias-cut edge, and a straight-cut edge, wherein the straw further comprises a stoppage band positioned adjacent the bias-cut edge of the straw;
   the lateral wall being perimetrically positioned around the base section;
   the outer brim being delineated by the lateral wall and oppositely positioned from the base section across the lateral wall;
   the opening being internally delineated by the outer brim, the lateral wall, and the base section;
   the inner locking lip and the outer locking lip being removably attached to the outer brim of the insulated cup; and
   the straw traversing into the insulated cup through the straw receiving hole.

10. The reusable beverage container as claimed in claim 9, wherein:
    the lid further comprises a gasket;
    the outer locking lip being perimetrically positioned around the lid;
    the straw receiving hole being positioned within the outer locking lip;
    the inner locking lip being positioned in between the outer locking lip and the straw receiving hole;
    the inner locking lip being concentric to the outer locking lip;
    the gasket being concentrically positioned with the inner locking lip and the outer locking lip; and
    the gasket being positioned in between the inner locking lip and the outer locking lip.

11. The reusable beverage container as claimed in claim 10, wherein the straw receiving hole being concentrically positioned with the outer locking lip and the inner locking lip.

12. The reusable beverage container as claimed in claim 9, wherein a diameter ratio between the straw receiving hole and the outer locking lip is about 1.5:10.

13. The reusable beverage container as claimed in claim 9, wherein:
    the bias-cut edge and the straight-cut edge being oppositely positioned from each other across the annular body;
    the annular body being concentrically positioned with the straw receiving hole;
    the straight-cut edge being externally positioned from the lid and the insulated cup; and
    the bias-cut edge being positioned within the lid and insulated cup, adjacent to the base section.

14. The reusable beverage container as claimed in claim 9, wherein
the stoppage band is perimetrically attached around the annular body, wherein the stoppage band is positioned between the bias-cut edge and the lid.

15. The reusable beverage container as claimed in claim 9, wherein the insulated cup is transparent.

16. The reusable beverage container as claimed in claim 9, wherein the lid is transparent.

* * * * *